Feb. 10, 1970   W. M. ALLEN   3,494,349
WINDSHIELD FOR A GRILL
Filed Feb. 1, 1968   3 Sheets-Sheet 1

INVENTOR.
William M. Allen
BY
Wood, Herron & Evans
ATTORNEYS

Feb. 10, 1970     W. M. ALLEN     3,494,349
WINDSHIELD FOR A GRILL
Filed Feb. 1, 1968     3 Sheets-Sheet 2

INVENTOR
William M. Allen
BY
Wood, Herron & Evans
ATTORNEYS

Feb. 10, 1970   W. M. ALLEN   3,494,349
WINDSHIELD FOR A GRILL
Filed Feb. 1, 1968   3 Sheets-Sheet 3
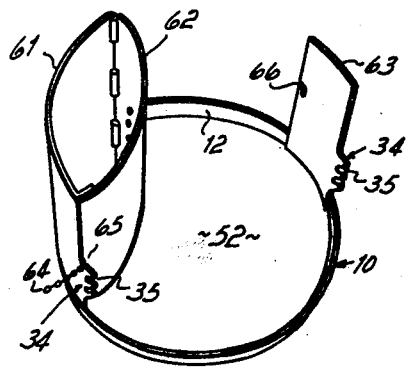
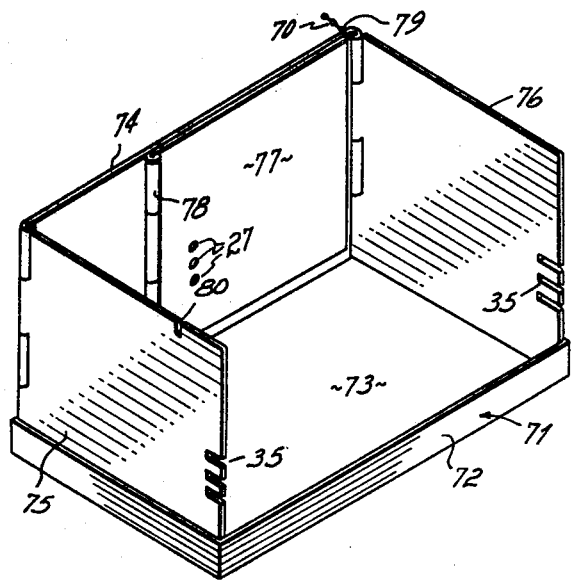
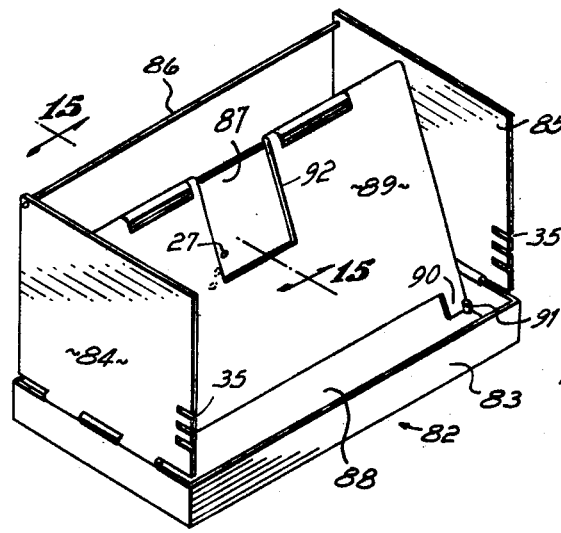
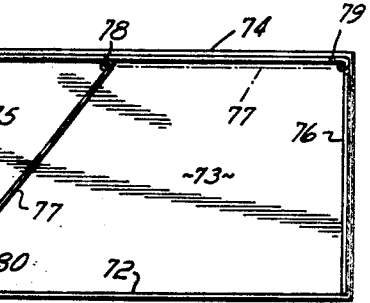
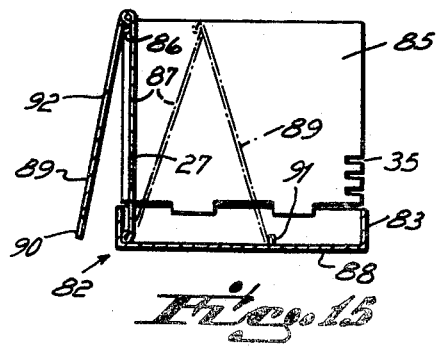
INVENTOR.
William M. Allen
BY
Wood, Herron & Evans
ATTORNEYS United States Patent Office 3,494,349
Patented Feb. 10, 1970

3,494,349
WINDSHIELD FOR A GRILL
William M. Allen, Cincinnati, Ohio, assignor to Development Consultants, Inc., Cincinnati, Ohio, a corporation of Ohio
Continuation-in-part of application Ser. No. 619,510, Feb. 15, 1967. This application Feb. 1, 1968, Ser. No. 707,004
Int. Cl. A47j 37/07
U.S. Cl. 126—25                      13 Claims

ABSTRACT OF THE DISCLOSURE

A windshield particularly adapted to be mounted on a grill bowl comprising, in preferred form, at least two panels associated together for providing the windshield configuration, at least one of the panels being movable between (a) the windshield configuration where all panels are substantially flush with the grill bowl's rim and (b) a chimney configuration where the chimney sides define an area on the grill bowl's bottom substantially less than the total area of the bottom.

---

This invention relates to grills and, more particularly, to a windshield for use with charcoal type grills that may be readily converted into a chimney to provide quick starting of a charcoal fire. This application is a continuation-in-part of my presently pending application, Ser. No. 619,510, filed Feb. 15, 1967, and now abandoned.

Grills with windshield attachments are, of course, very well known today and are used and enjoyed by innumerable families when "grilling out." Generally speaking, grills employ charcoal as the primary combustible material. The charcoal fire is usually ignited by spreading the charcoal, which is in the form of briquettes or chunks, over the bottom surface of the grill bowl. A starter aid, for example, a starter liquid or paper, is then used to ignite the briquettes or chunks. However, this method of starting a fire results in quite a time consuming wait before the charcoal coals are ready for use. For example, a waiting period of 20 to 30 minutes is not unusual for the charcoal to reach a desirable heat level. In addition, it is generally quite difficult to achieve even burning of the charcoal bed when the briquettes or chunks are spread across the grill bowl's bottom.

Among the devices which are useful with grills for diminishing the time required for charcoal coals to reach the desirable heat level is a chimney or stack-type structure adapted to be placed in the grill bowl when commencing use of the grill. The chimney receives a charge of charcoal and suitable starter aid. Subsequently, the charge is lighted and the charcoal permitted to attain the desired heat level prior to the chimney being removed and the charcoal being spread evenly over the bowl's bottom surface. The use of such a chimney or stack has been found to relatively rapidly effect combustion of the charcoal so that the waiting time between the charging of the grill bowl and the readiness of the charcoal for grilling is drastically reduced. For example, it is not uncommon that charcoal fires started with this type of apparatus may produce coals at the desired heat level for grilling in one-third the time required for obtaining equivalent coals by the usual starting techniques. In addition, the chimney materially aids in preparing all the briquettes or chunks at about the same combustion and heat level.

This invention contemplates a windshield for a grill bowl preferably of the charcoal type that is adapted to serve two functions, namely, a windshield function and a chimney function. The windshield comprises, in preferred form, at least two panels associated together for providing the windshield configuration, at least one of the panels being movable between the windshield configuration and the chimney configuration to establish those configurations. When in the windshield configuration, all panels are substantially flush with the grill bowl's rim. When in the chimney configuration the area on the grill bowl's bottom defined by the chimney's sides is, in the preferred invention form, substantially less than the total area of the bottom.

This invention also contemplates simplified apparatus for maintaining a grill grid at varying heights above the grill bowl. Such apparatus includes at least one projection extending outwardly from the periphery of the grid for placing in any of a series of vertically spaced apertures that are formed in the windshield. The windshield is also provided with grid holder means for cooperating with the aperture-projection structure to adequately hold the grill grid in its desired position, the holder means having a series of vertically spaced notches located in substantially the same horizontal planes as the vertically spaced apertures.

Accordingly, it has been an objective of this invention to provide a grill that has a windshield comprised of at least two panels that are capable of performing dual functions, namely, a chimney function when starting a charcoal fire and a windshield function once the fire has been started.

It has been another objective of this invention to provide simplified, novel means in conjunction with the windshield for maintaining the grill grid at varying heights, as desired, above the grill bowl.

Other objectives and advantages of this invention will become more apparent from the following detailed description taken in conjunction with the drawings in which:

FIGURE 11 is a perspective view of a second alternative embodiment of the windshield;

FIGURE 12 is a perspective view of a third alternative embodiment of the windshield;

FIGURE 13 is a top view of the embodiment illustrated in FIGURE 12;

FIGURE 14 is a perspective view of a fourth alternative embodiment of the windshield; and FIGURE 15 is a cross-sectional view taken along lines 15—15 of FIGURE 14.

Figure 2:
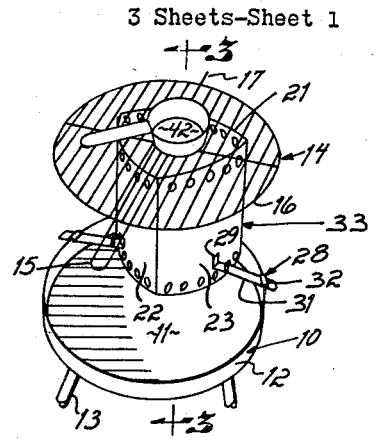
FIGURE 2 is a perspective view similar to FIGURE 1 but showing the windshield in the chimney configuration.
Figure 3:
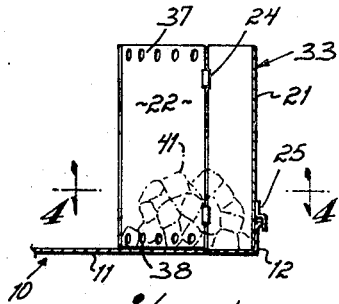
FIGURE 3 is a cross-sectional view taken along lines 3—3 of FIGURE 2.

A typical charcoal type grill for use with the windshield of this invention includes a circular grill bowl 10 having a substantially flat bowl bottom 11 and upstanding rim 12 about the periphery of the bowl bottom, see FIGURES 1-6. The total area of the grill bowl's bottom 11 is defined by the rim 12. The bowl 10 is supported by suitable legs 13 extending downwardly from the bowl. A grill grid 14 of typical circular configuration is also provided, the grid having a handle 15 that extends over the rim 12 of the grill bowl to permit easy access and handling of the grid, and the food thereon, during grilling. The grid 14 is modified in accordance with this invention to provide a peripheral ring 16 and at least one projection 17, the purpose of which will be subsequently explained.

A windshield 20 formed in accordance with the principles of one preferred embodiment of this invention is provided for cooperation with the grill, the windshield being adapted to serve a dual purpose, namely, to guard against excessive wind drafts and to accomplish rapid starting of the charcoal, see FIGURES 1-6. The windshield 20 comprises a center panel, 21, a left wing panel 22, and a right wing panel 23, the wing panels being connected to the center panel by suitable hinges 24 on vertically positioned hinge lines 19. The center panel 21 is preferably secured to the rim 12 of the grill bowl 10 by suitable fasteners such as, for example, clips 25. The center panel 21 is provided with air circulation means by a plurality of openings 26 positioned along its top edge. At least two vertically spaced holes 27 extend upwardly from the top edge of the rim 12 in the panel's vertical center line for receiving the grid's projection 17, as will be subsequently explained.

Each wing panel 22, 23, being hinged to the center panel 21, is adapted to swing inwardly from the peripheral rim 12 toward the center of the bowl 10. Each wing panel 22, 23, on its outside face, carries a hook 28, see FIGURES 4 and 5. The hook 28 includes a mount 29 permanently secured to the wing panels 22, 23 at a position just above the top of the rim 12; the hook also includes an extension arm 31 which is pivotally connected to the mount 29, the extension arm having a ripple 32 adapted to fit over the top of the rim 12 when the respective wing panels 22, 23 are in the chimney configuration for maintaining the panels in that configuration. Each wing panel 22, 23 also mounts holder means in the form of a grid holder 34 toward the free or leading edge of each panel. The grid holder 34 provides a series of vertically spaced notches 35 that are located in substantially the same horizontal plane as the vertically spaced holes 27 of the center panel 31. Air circulation means is defined in each wing panel 22, 23 at both the top and bottom of the panel. A series of horizontally spaced holes 37 at the top of each panel 22, 23, analagous to the holes 26 of the center panel 21, are provided. Also, a series of horizontally spaced air access holes 38 are provided at the base of each wing panel 22, 23. Instead of the air access holes 38 at the bottom of the wing panels 22, 23, alternatively the wing panels can be mounted so that a gap is established between the bottom of each wing panel and the bowl bottom 11 when the wing panels are swung into the chimney configuration.

Figure 1:
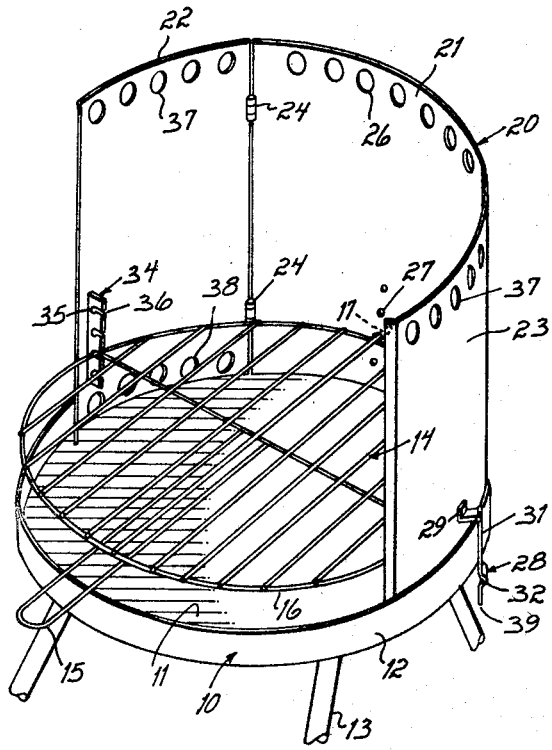
FIGURE 1 is a perspective view of a windshield formed in accordance with the principles of this invention in combination with a charcoal type grill, the windshield being shown in the windshield configuration.
Figure 5:
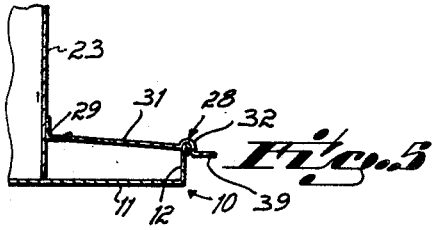
FIGURE 5 is a cross-sectional view taken along lines 5—5 of FIGURE 4.
Figure 6:
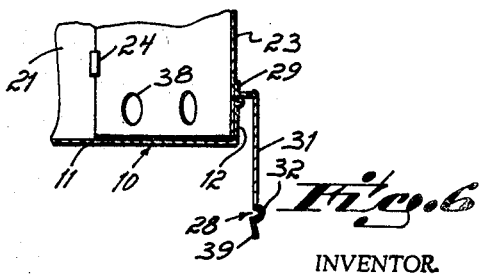
FIGURE 6 is a view similar to FIGURE 5 taken when the windshield is in the windshield configuration.

In operation, during the grilling of food objects such as, for example, steaks, the windshield 20 is placed in the familiar configuration depicted in FIGURE 1, that is, the wing panels 22, 23 being positioned flush against the inner surface of the rim 12 and the hooks 28 being pivoted downwardly and out of the way, as shown more particularly in FIGURE 6, to aid in maintaining the panels 22, 23 in the windshield configuration. When placed in this configuration, the windshield does function as a shield against the wind and the peripheral length of the windshield is greater than one-half the peripheral length of the rim 12. The windshield 20 is also held in the windshield configuration through cooperation of the peripheral ring 16 of the grid 14 with the inner surface of the center 21 and wing panels 22, 23. The grid 14 is maintained at a selected height from the bottom 11 of the grill bowl by placing the projection 17 extending from the grid through a selected hole 27 in the center panel 21 and engaging the ring 16 with corresponding notches 35 carried by the ring holders 34 on the wing panels 22, 23. Thus, the grill is adapted for grilling in the customary manner.

Figure 4:
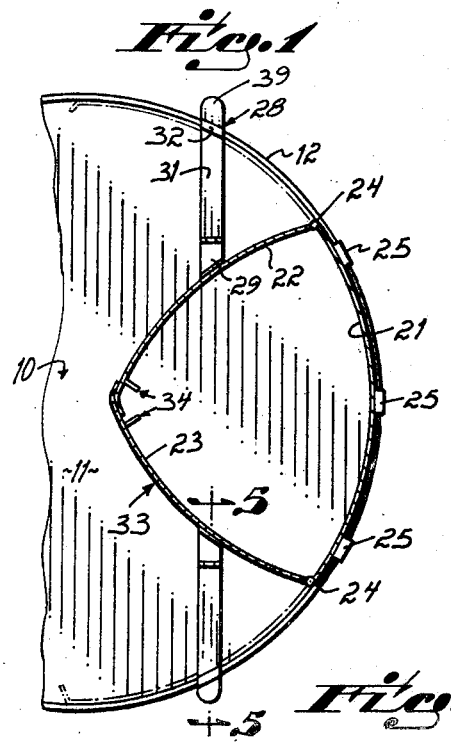
FIGURE 4 is a cross-sectional view taken along lines 4—4 of FIGURE 3.

When inital ignition of charcoal 41 is desired the wing panels 22, 23 are moved inwardly toward the center of the grill bowl until they are mated to form the chimney configuration, see FIGURES 2 and 4. As can be seen from FIGURE 4, the chimney sides made up of panels 21-23 define an area 40 on the grill bowl's bottom 11 that is substantially less than, that is, less than one-half of, the total area of the bottom 11 as defined by the rim 12. This embodiment of the invention (illustrated in FIGURES 1-6) shows the chimney 33 having three sides with air vents at both the bottom (on the two wing panels, 22, 23) and at the top (on all three panels 21-23). The wing panels 22, 23 are retained in the mated or chimney configuration by pivoting the hooks 28 upwardly and engaging the ripple 32 with the top edge of the peripheral rim 12, see FIGURES 2 and 5. Subsequently, the charcoal 41 is placed within the chimney, ignited, and burned until it reaches a suitable combustion and heat level. The air vents 38 at the base of the wing panels 22, 23 permit sufficient oxygen to enter the base of the fire to enhance combustion of the charcoal. To aid in initial ignition of the charcoal, a suitable starter material such as, for example, liquid starter or paper, may be used. If paper is employed, the paper is first placed at the bottom of the chimney and the charcoal 41 piled on top of the paper. Of course, if a liquid starter material is used, the charcoal 41 is merely given a suitable sprinkling in the usual manner.

Not only does the chimney provide a drastic reduction in starting time for the charcoal to reach the desired combustion temperature, but it also provides a concentrated heat source for certain cooking requirements where such a concentrated source is needed. As depicted in FIGURE 2, the grill grid 14 may be placed over the top of the chimney and a pan or skillet 42 placed in cooking position to receive the concentrated heat. There is no problem with the fire being suffocated through lack of air supply because the air openings 26, 37 have been provided at the top of the chimney panels.

Once the charcoal 41 has reached the desired combustion level, and once all cooking that requires concentrated heat source has been completed, the movable wing panels 22, 23 are merely pivoted out of engagement one with the other back toward their normal windshield configuration, that is, flush with the bowl rim 12, as shown in FIGURE 1. The wing panels 22, 23 may be pivoted back to their original position by merely grasping the hooks 28 as it has been found that, in this preferred embodiment, the hooks are of sufficient length so as not to become unduly heated at their ends or thumb grasps 39. The charcoal 41 is then spread throughout the grill bowl 10, the grid 14 inserted at the appropriate and desired level as determined by the notches 35 and vertically spaced apertures 27, and the grill is ready again for continuous use.

Figure 7:
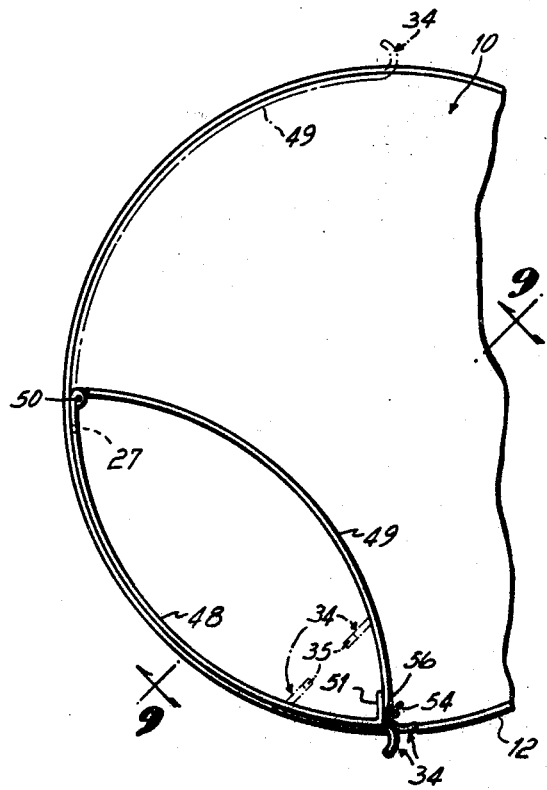
FIGURE 7 is a partial top view of a first alternative embodiment of the windshield.
Figure 8:
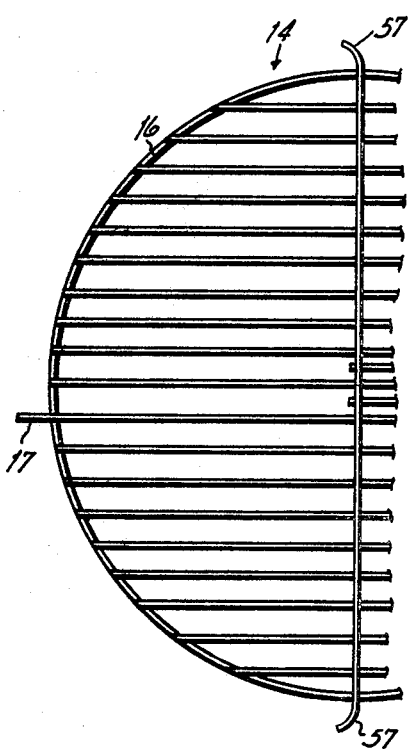
FIGURE 8 is a partial top view of a grid for use with the windshield illustrated in FIGURE 7.
Figure 9:
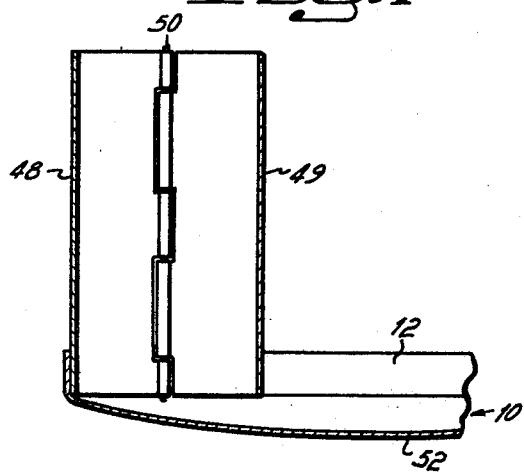
FIGURE 9 is a cross-sectional view taken along lines 9—9 of FIGURE 7.

A first alternative embodiment of the invention is illustrated in FIGURES 7-9. FIGURE 7 shows a windshield comprised of only two panels, namely, a first panel 48 affixed to the rim 12 of the grill bowl 10 and a second panel 49 pivotally mounted to the first panel on a vertical hinge line by hinges 50. The second panel 49 is movable between the windshield configuration illustrated in phantom lines, and the chimney configuration illustrated in solid lines (see FIGURE 7). As shown, each panel 48, 49 is equal in peripheral length to about one-fourth the periphery of the grill bowl's rim 12. The first panel 48 includes, at its leading edge, a mating flange 51 so that when the second panel 49 is moved to the chimney configuration the mating flange mates with the leading edge of that movable panel to provide a substantially air tight seal, see FIGURE 7. As can be seen from FIGURE 9, the panels 48, 49 are adapted to cooperate with a grill bowl 10 having a concave or bowl shaped bottom 52 instead of the flat bottom illustrated for the grill of FIGURES 1–6. The bowl shaped bottom 52 means that no air access holes need be provided at the bottom edge 52 of the movable panel 49 in this embodiment as sufficient air access is provided between the bottom of the movable panel and the bottom of the grill bowl when the movable panel is in the chimney configuration. The movable second panel 49 is maintained in chimney configuration with the stationary first panel 48 by a suitable chain 54 mounted to the first panel as at 55 and adapted to pass through a chain notch 56 in the grid holder 34 of the second panel, see FIGURES 9 and 10. Again in this embodiment it will be noted that the chimney sides (made up of panels 48, 49) define an area on the grill bowl's bottom that is substantially less than, that is, less than one-half of, the total area of the bottom, see FIGURE 7.

The grill grid 14 of the first alternative embodiment is provided with a projection 17 to cooperate with a series of vertically spaced holes 27 positioned in the first panel 48. The grid holder 34 is positioned toward the leading edge of each panel 48, 49 with each holder being provided with a series of notches 35 positioned in the same horizontal plane as the vertically spaced holes 27. The grid holders 34 are flared outwardly, note FIGURE 7, so that when the movable panel 49 is mated with the first panel 48 the holders do not conflict with one another. Alternatively, the holders 34 could be positioned at a distance substantially removed from the leading edge of the first and second panels 48, 49 so that, when the panels are in chimney configuration, the holders do not conflict, see phantom lines in FIGURE 7. The grill grid 14, in addition to the projection 17 provided for cooperating with the vertically spaced holes 27, is provided with two fingers 57 adapted to cooperate with the notches 35 in each holder 34. The fingers 57 are required in this particular embodiment because the grid holders 34 flare outwardly, and, hence, cannot engage the grid ring 16. Thus, in grilling position the fingers 57 cooperate with the notches 35 in the grid holders 34 and the projection 17 is inserted into one of the vertically spaced holes 27 to retain the grill grid 14 in operating engagement with the windshield.

Figure 10:
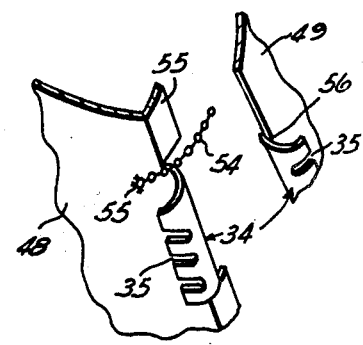
FIGURE 10 is a fragmentary perspective view of the free ends of the windshield in a partially closed position.

A second alternative embodiment is illustrated in FIGURE 11. In this embodiment there are provided three panels 61–63, two panels 61, 63 of which are fixed to the rim 12 of the concave or bowl shaped bottom 52 of the grill. One of the panels, namely, center panel 62, is movable between the windshield configuration where all panels 61–63 are flush against the grill bowl's rim and the chimney configuration which is formed of only the center panel 62 and one wing panel 61. In this embodiment it is the wing panels 61, 63 which are fixed and the center panel 62 which is movable, the center panel being hingedly connected to the wing panel 61. The center panel is retained in the chimney configuration with the wing panel 61 by a chain 64 fixed to the movable panel 62 and adapted to cooperate with a chain notch 65 in the wing panel 61 in similar manner as shown in FIGURES 9 and 10 for the first alternative embodiment. The center panel 62 is retained in the windshield configuration through cooperation of the chain 64 with a second chain notch 66 provided in the other wing panel 63. Again in this embodiment there is provided a windshield having a panel movable to form a chimney configuration the sides of which (constituted by the panels 61, 62) define an area on the grill bowl bottom 11 substantially less than the total area of the bottom. The wing panels 61, 63 carry the grid holders 34, as before described, and the center panel 62 is provided with the vertically spaced holes 27, as before described, both of which cooperate together to receive the grill grid of the type illustrated in FIGURE 8.

The third alternative embodiment of the windshield is illustrated in FIGURES 12 and 13 with a rectangularly configured grill bowl 71, as opposed to the circular grill bowls 10 illustrated in FIGURES 1–11, the grill bowl 71 having a rim 72 enclosing a bottom area 73. The windshield comprises a center panel 74 and two wing panels 75, 76 with a separate chimney panel 77 being connected by hinges 78 along a vertical hinge line to the center panel 74. The chimney panel 77 is thereby mounted to pivot between the windshield configuration whereat it is positioned flush with the center panel 74, see FIGURE 12 and phantom line position of FIGURE 13, and the chimney configuration, see FIGURE 13. When in the windshield configuration the chimney panel 77 is retained against the center panel 74 by a chain 70 mounted to the chimney panel and receivable with a first chain notch 79 in the center panel. In the chimney configuration the chimney panel 77 is retained by the chain 70 cooperating with a second chain notch 80 in the wing panel 75. Because the chimney panel 77 does not extend even with the bottom 73 of the bowl 71, see FIGURE 12, when in the chimney configuration an air gap is provided between the bottom of the chimney panel and the bottom 73. As can be seen from FIGURE 13 the area on the bowl's bottom 13 defined by the chimney sides, that is, by panels 75, 74 and 77, is substantially less than, that is, less than one-half of, the total area of the bottom. The center panel 74 and chimney panel 77 are provided with a series of aligned vertically spaced holes 27 and the wing panels are provided with a series of notches 35, the holes and notches being established in the same horizontal plane so as to receive a rectangularly shaped grill grid, not shown, having a projection and fingers substantially as illustrated in FIGURE 8. The wing panels 75, 76 are hinged to the center panel 74 so that the windshield can be removed from the grill bowl 71, then folded flat and laid in the bottom of the grill bowl for storage purposes.

The fourth alternative embodiment of the invention is illustrated in FIGURES 14 and 15. FIGURE 14 depicts a rectangular grill bowl 82 having a rim 83 with wing panels 84, 85 hingedly mounted on horizontal hinge lines to the ends of the rectangularly shaped bowl. The wing panels 84, 85 are maintained in an upright position by removable guide rod 86. The center panel 87, which in combination with the two wing panels 84, 85 forms the windshield configuration, is hingedly mounted to the bottom 88 of the grill bowl along a horizontal hinge line. A chimney panel 89 is hingedly connected along a horizontal hinge line to the top of center panel 87. The chimney panel 89 is provided with a foot 90 at either end adapted to cooperate with stops 91 mounted to the bottom 88 of the grill bowl so that, when the center panel and chimney panel are in the chimney configuration, as illustrated in solid lines of FIGURE 14 and in phantom lines of FIGURE 15, there will be suitable air access to the charcoal within the tent-like chimney configuration. The chimney panel 89 defines a substantial hole 92 centrally of the panel to provide a suitable smoke outlet for the tent-like chimney configuration, the chimney in this embodiment being defined by the wing panels 84, 85, the center panel 87, and the chimney panel 89. When in the windshield configuration the chimney panel 89 is pivoted over support rod 86, see solid lines of FIGURE 15. It will be particularly noted that in this embodiment, too, the chimney sides consisting of wing panels 84, 85, center panel 87, and chimney panel 89 define an area on the bowl's bottom 88 less than the total area of the bottom. The wing panels 84, 85 are provided with notches 35 and the center panel 87 is provided with a series of vertically spaced apertures 27, the notches and apertures being provided on substantially the same horizontal plane so as to receive a rectangularly shaped grill grid, not shown, in the same manner described for the embodiment illustrated in FIGURES 12 and 13. This embodiment may also be folded into a compact unit by folding the center 87-chimney 89 panel structure flush against the bottom 88 of the bowl 82 and thereafter folding the wing panels 84, 85 down on top.

Although the invention has been described in considerable detail with particular reference to the preferred embodiments thereof, other variations and modifications may be effected by those skilled in the art and still remain within the spirit and scope of the invention as defined in the appended claims.

Having described the preferred embodiment of my invention, what I desire to claim and protect by Letters Patent is:

1. A grill comprising
a grill bowl having a rim and a bottom, and
at least two panels associated together for providing a windshield configuration mounted on said grill bowl, at least one of said panels being movable between a windshield configuration where all the panels are substantially flush with the grill bowl's rim and a chimney configuration where the chimney sides define an area on the grill bowl's bottom less than the total area of the bottom.

2. A grill as set forth in claim 1 wherein said area defined by the chimney sides is less than about one-half the total area of the bottom.

3. A grill as set forth in claim 1 wherein said panels include
a center panel and two wing panels.

4. A grill as set forth in claim 3 wherein said center panel is hingedly secured to one of said wing panels.

5. A grill as set forth in claim 3 wherein the wing panels are hingedly secured to opposite sides of said center panel.

6. A grill as set forth in claim 3 including
means fixed to at least one of said panels to maintain said panels in the chimney configuration.

7. A grill as set forth in claim 1 wherein at least one of said panels is provided with air access means relatively near the top of said panel.

8. A grill as set forth in claim 1 wherein at least one of said panels is provided with air access means relatively near the bottom of said panel.

9. A grill as set forth in claim 1 wherein said windshield comprises only two panels.

10. A grill as set forth in claim 1 wherein said windshield includes
a center panel, and
a chimney panel mounted to said center panel and adapted to swing between the windshield configuration and the chimney configuration.

11. A grill as set forth in claim 1 wherein said grill bowl is substantially circular.

12. A grill as set forth in claim 1 wherein said grill bowl is substantially rectangular.

13. A grill as set forth in claim 1 wherein said panels are hingedly mounted together on a substantially vertical hinge line.

References Cited

UNITED STATES PATENTS

| | | | |
|---|---|---|---|
| 1,438,345 | 12/1922 | Tait et al. | 126—9 |
| 2,556,365 | 6/1951 | McKnight | 126—25 |
| 2,894,447 | 7/1959 | Persinger et al. | 126—25 X |
| 3,384,066 | 5/1968 | Tufts | 126—9 |

EDWARD G. FAVORS, Primary Examiner